Patented July 26, 1949

2,476,991

UNITED STATES PATENT OFFICE 2,476,991

QUICK-DRYING WRITING INK

Raymond Lemuel Mayhew, Phillipsburg, N. J., assignor to General Aniline & Film Corporation, New York, N. Y., a corporation of Delaware No Drawing. Application July 11, 1945,
Serial No. 604,511

8 Claims. (Cl. 106—22)

This invention relates to the preparation of blue to bluish-green writing inks of the quick-drying type.

It is known to prepare brightly colored quick-drying inks by the use of dyestuffs and caustic alkali, the pentrative quality of the caustic alkali causing the ink to be rapidly absorbed by the paper. Up to the present, however, a commercially satisfactory blue to bluish-green writing ink of this kind has not been produced. This has been due to the instability to caustic alkali of the dyestuffs heretofore employed in the formulation of the inks, the dyestuffs undergoing breakdown during storage to decomposition products which either caused sludge formation in the ink or gave a color thereto radically different in shade from that of the original solution of the dyestuff.

It is an object of the present invention to provide blue to bluish-green caustic alkali-containing quick-drying writing inks of improved color stability. Further objects will become apparent as the description proceeds.

I have found that the above objects may be accomplished by employing as dyestuffs for quick-drying writing inks of the aforementioned type, certain dilute aqueous caustic alkali-soluble derivatives of copper phthalocyanines of the benzene series.

The term copper phthalocyanines of the benzene series as used herein means tetraazaporphins in which each of the four pyrrole nuclei is fused to a phenylene nucleus and copper is contained in the molecule in complex combination.

The dyestuffs for the inks of the present invention are copper phthalocyanines of the benzene series containing attached to the phenylene nuclei of the phthalocyanine molecule a plurality of heterocyclic sulfonamide groups selected from among the sulfonamidopyridenyl, sulfonmorpholidyl and [3'-methyl-5'-oxo-1'-pyrazolyl]sulfonamidophenyl groups. They may be prepared by reacting the corresponding copper phthalocyanine polysulfonylchlorides with, for example, 2-, 3- or 4-aminopyridine, morpholine, 1-(2'-aminophenyl)-, 1-(3'aminophenyl)- or 1-(4'-aminophenyl)-3-methyl-5-pyrazolone, etc., in the presence of a suitable diluent for the reaction such as water, nitrobenzene, acetone, etc., at room temperature. The number of these heterocyclic sulfonamide groups will vary depending on the number of sulfonylchloride groups on the phenylene nuclei of the starting copper phthalocyanine. In some instances the dyestuffs may contain attached to the phenylene nuclei, in addition to the heterocyclic sulfonamide groups, one or more sulfonic acid groups, either free or in the form of the amine salt, or other substituents, such as halogen atoms, e. g., chlorine, or amino or carboxy groups, etc. By introducing a sufficient number of these heterocyclic sulfonamide groups onto the phenylene nuclei, copper phthalocyanine heterocyclic sulfonamides may be obtained which are soluble in dilute aqueous caustic alkali, e. g., sodium, potassium or lithium hydroxide, etc.

The starting copper phthalocyanine polysulfonylchlorides employed in the preparation of the dyestuffs may be obtained by reacting chlorosulfonic acid with the corresponding copper phthalocyanines at an elevated temperature as described in U. S. P. 2,219,330. They may also be made from the corresponding copper phthalocyanine polysulfonic acids or their salts by treatment with phosphorous pentachloride.

The following specific examples are illustrative of the preparation of the dyestuffs. Parts are by weight unless otherwise noted.

Example 1

Ten parts of copper phthalocyanine tetrasulfonylchloride is slowly stirred into a solution of 10 parts of 2-aminopyridine in 100 parts of nitrobenzene and the resulting mixture stirred for 10–12 hours at room temperature. The nitrobenzene is then removed from the reaction mixture by means of a steam distillation and the resulting solution evaporated to a thick syrupy residue. Upon cooling, the residue is poured into 100 volumes of 10% hydrochloric acid and the precipitate filtered and dried. A bright blue dyestuff is obtained which is quite soluble in dilute aqueous caustic alkali.

Example 2

Ten parts of copper phthalocyanine tetrasulfonylchloride is stirred into a solution of 6 parts of 1-(3'-aminophenyl)-3-methyl-5-pyrazolone and 5.5 parts of sodium acetate in 50 parts of acetone. The mixture is then stirred at room temperature until the reaction is complete whereupon the acetone is evaporated, and the resulting powder stirred into 100 volumes of water and the resulting solution acidified by means of 10% hydrochloric acid. The resulting precipitate is filtered and dried. A bluish-green powder is obtained which is also quite soluble in dilute aqueous caustic alkali.

Example 3

Ten parts of copper phthalocyanine tetrasulfonylchloride is stirred into 50 parts of water in in which has been dissolved 10 parts of morpholine. The whole mixture is then stirred at room temperature for several hours after which the mixture is stirred into 100 volumes of 10% hydrochloric acid. The resulting precipitate is filtered and dried. A bluish-green powder is obtained which is soluble in dilute aqueous caustic alkali.

Quick-drying inks may be prepared in accordance with the invention by dissolving a small amount of one of the copper phthalocyanine heterocyclic sulfonamides in a dilute aqueous solution of a caustic alkali, e. g., sodium, potassium or lithium hydroxide. Sodium hydroxide generally is to be used because of its lower cost. The concentration of the dyestuff and caustic alkali may be varied depending on the depth of shade and rate of drying desired in the ink. The caustic alkali should be used in concentrations corresponding to those disclosed in U. S. P. 1,932,248 and, as there described in terms of sodium hydroxide, it should not be below 0.1% and generally may be about 0.5% to about 2% or slightly more.

Other ingredients found desirable in the art and which do not interfere with the functioning of the dyestuffs may be contained in the inks. As described in the aforesaid U. S. P. 1,932,248, starch may be used for preventing feathering of the ink on the paper, bentonite for improving its flow characteristics and, where required by usage in the trade for greater permanency, alkali soluble metal salts which on exposure to light give colored oxides, e. g., ammonium metavanadate or potassium ferro-cyanine. Small amounts of wetting agents resistant to dilute caustic alkali may be used to further speed up the absorption of the ink by the paper, for example, a sulfated higher alcohol of which a commercial representative is Gardinol WA (sodium salt of technical lauryl sulfate). A hygroscopic agent, such as ethylene glycol, diethylene glycol, glycerol, etc., may be added to the ink to keep the point of the pen moist when exposed to the atmosphere.

A specific formula for the preparation of quick-drying writing inks in accordance with the invention is as follows:

| | Parts |
|---|---|
| Copper phthalocyanine sulfonamide (product of Example 1) | 2 |
| Sodium hydroxide | 1.6 |
| Sodium salt of technical lauryl sulfate | 0.01 |
| Ammonium metavanadate | 0.35 |
| Ethylene glycol | 0.7 |
| Water | 100 |

The above solution represents an attractive blue writing ink of excellent stability. It is permanent in character and the writing therefrom is still legible after soaking the paper in water for 24 hours. Depending on the particular phthalocyanine heterocyclic sulfonamide employed as the colorant, the shade of the ink may vary from blue to bluish-green.

As various other embodiments of the invention will occur to those skilled in the art, it is not intended that the scope of the patent be limited except as is required by the prior art and the appended claims.

I claim:

1. A quick-drying writing ink comprising in solution a copper phthalocyanine of the benzene series having attached to the phenylene nuclei a plurality of heterocyclic sulfonamide groups selected from the class consisting of sulfonamidopyridinyl and sulfonmorpholidyl groups, a hygroscopic polyhydric alcohol, water and caustic alkali, the content of caustic alkali in the ink being equivalent to from about 0.5–2% of sodium hydroxide.

2. A quick-drying writing ink as defined in claim 1, wherein the solution contains a wetting agent.

3. A quick-drying writing ink comprising in solution a copper phthalocyanine of the benzene series having attached to the phenylene nuclei a plurality of sulfonamidopyridinyl groups, a hygroscopic polyhydric alcohol, water and caustic alkali, the content of caustic alkali in the ink being equivalent to from about 0.5–2% of sodium hydroxide.

4. A quick-drying writing ink as defined in claim 3, wherein the solution contains a wetting agent.

5. A quick-drying writing ink as defined in claim 3, wherein the hygroscopic alcohol is ethylene glycol.

6. A quick-drying writing ink comprising in solution a copper phthalocyanine of the benzene series having attached to the phenylene nuclei a plurality of sulfonamidopyridinyl groups, ethylene glycol, sodium lauryl sulfate, water and sodium hydroxide, the content of sodium hydroxide in the ink being from about 0.5–2%.

7. A quick-drying writing ink comprising in solution a copper phthalocyanine of the benzene series having attached to the phenylene nuclei a plurality of sulfonmorpholidyl groups, a hygroscopic polyhydric alcohol, water and caustic alkali, the content of caustic alkali in the ink being equivalent to from about 0.5–2% of sodium hydroxide.

8. A quick-drying writing ink as defined in claim 7, wherein the solution contains a wetting agent.

RAYMOND LEMUEL MAYHEW.

REFERENCES CITED

The following references are of record in the file of this patent:

UNITED STATES PATENTS

| Number | Name | Date |
|---|---|---|
| 1,848,077 | Huffman | Mar. 1, 1932 |
| 1,932,248 | Miner et al. | Oct. 24, 1933 |
| 2,300,572 | Hoyer et al. | Nov. 3, 1942 |

FOREIGN PATENTS

| Number | Country | Date |
|---|---|---|
| 496,663 | Great Britain | Dec. 5, 1938 |
| 520,199 | Great Britain | Apr. 17, 1940 |